United States Patent Office 3,725,047
Patented Apr. 3, 1973

3,725,047

RECOVERY OF NOBLE METALS

Michael Schneider, Munich, Germany, assignor to Girdler-Sudchemie Katalysator G.m.b.H., Munich, Germany No Drawing. Filed June 2, 1971, Ser. No. 149,374
Claims priority, application Germany, June 4, 1970, P 20 27 477.5
Int. Cl. C22b *61/00*
U.S. Cl. 75—108 5 Claims

ABSTRACT OF THE DISCLOSURE

Noble metals, particularly metals of the platinum group and gold are separated from other materials in aqueous acidic solution by precipitation in elemental form by reaction with an alkene or other compound containing a C—C double bond, in the presence of an oxidizing agent such as oxygen.

This invention relates to a method for recovering palladium, gold, rhodium and/or ruthenium from residues containing the same. More particularly it relates to the recovery of said metals by reaction with an alkene and an oxidizing agent in an acid medium.

BACKGROUND OF THE INVENTION

Increasing amounts of noble metals are required in technology. For example, a large percentage of the palladium offered on the market is used for the preparation of palladium catalysts. These catalysts deteriorate after a certain time, and the metal, in view of its value, is recovered according to various methods. Depending on the presence of other elements and the concentration of palladium, either a lead metallurgical process is used in which the palladium during the melting process is enriched in the added lead, and the base metals are withdrawn in the form of their oxides together with lead oxide, or a silver metallurgical process is used wherein silver in addition to slag-forming substances are added, whereby the palladium is enriched in the silver. As an alternative, it is possible to exeract the palladium from the original composition by means of acids.

In the prior procedures no pure palladium or palladium salt is obtained, and a further purification process is necessary. As a rule, the solution containing palladium and other metals is mixed with zinc dust whereby the palladium is deposited on the zinc and subsequently has to be separated from the zinc. This is done, after a previous solution process, by precipitating the palladium as $Pd(NH_3)_2Cl_2$, i.e. by making the ammonical solution of the metal slightly acid with hydrochloric acid. This method is time-consuming. Furthermore, the Pd-complex is slightly soluble which results in palladium losses.

SUMMARY OF THE INVENTION

It has now been found that the time-consuming processing of contaminated palladium, gold ruthenium and rhodium salt solutions can be shortened significantly and rendered more economical, and that the yield of noble metal can be increased if compounds having C—C double bonds, such as alkenes, and oxidizing agents are added to an acid aqueous solution containing the noble metals. In this way, the noble metals are quantitatively deposited in pure form.

Chloride solutions are the most commonly used noble metal salt solutions, but other solutions, such as nitrate and sulfate solutions may also be used, as well as salts of organic acids such as acetic acid.

The alkenes to be used are preferably open-chain unsubstituted alkenes, more preferably those containing 2 to 8 carbon atoms. Ethylene and propylene are especially preferred. Cyclic alkenes and substituted alkenes may also be used, such as cyclohexene, styrene mono and dichloroalkenes having 2 to 8 carbon atoms, such as vinylidene chloride and related halogenated alkenes, as well as acrolein. In general, the reaction rates are increased with lower molecular weight C—C double bond compounds.

As oxidizing agent, the oxygen of the air is preferably used for economic reasons, but it is also possible to use pure oxygen, hydrogen peroxide or other common oxidizing agents, such as chromates or bichromates, permanganates, perchlorates and the like. These oxidizing agents are soluble in the reaction medium.

The pH of the reaction medium is less than 6, preferably less than 5, more preferably less than 3. There is no lower limit for the pH because the reaction may also be carried out in concentrated acids, such as concentrated HCl.

DETAILED DESCRIPTION

The following specification describes only the recovery of palladium and gold for reasons of brevity, but the method according to the invention may also be used for the recovery of Pd-Au mixtures and of other metals of the platinum group, i.e. rhodium and ruthenium.

The precipitation has to be carried out in an acid medium in order to avoid the co-precipitation of other cations. The previous precipitation of other accompanying elements in neutral or alkaline medium, prior to the precipitation of the palladium would also be disadvantageous because the preceding precipitation would co-precipitate part of the palladium salt, and would result in losses. The technical advance of the method is not only determined by the reduction in working time and by the increased yields in palladium, but is also determined by the application of few, cheap raw materials and by the immediate recovery of pure, finely divided metal.

When applying the method according to the present invention, the palladium is quantitatively precipitated within a short time as a black metal powder which generally does not require subsequent purification. Thus, it has been found that even in the presence of equal parts by weight of Al, Fe, Mg, Ca and colloidal silica in the palladium solution, the precipitated palladium had a purity of about 99.6%. The resulting metal can be easily dissolved in nitric acid and hydrochloric acid or chlorine and hydrochloric acid, and can be precipitated once more according to the same method to meet special requirements, which method results in very high purity metal.

The method is quantitative in that palladium cannot be detected in the filtrates. The separation from base metals other than those mentioned above is also quantitative. Even metals which are close to the noble metals Pd and Au in the electrochemical series of the elements, such as Ag, Cu and Hg, are not co-precipitated. The quantitative precipitation of the palladium may be carried out at room temperature, but preferably, the solution is heated.

As stated above, the method according to the invention also permits the quantitative precipitation of gold, rhodium, ruthenium and other metals of the platinum group.

The following examples will serve to illustrate the invention. All parts and percentages are by weight unless otherwise noted.

EXAMPLE 1

An inactive Pd-catalyst containing 0.5% by weight of palladium on a carrier consisting of approximately 90% $SiO_2$, 5%, $Al_2O_3$, 2% $FeO_3$, 2% CaO, 1% MgO, was extracted with a mixture of dilute hydrochloric acid and $Cl_2$ to dissolve the metal. The excess chlorine in resulting hydrochloric acid-$PdCl_2$ solution was liberated by boiling and the solution was subsequently brought to 80° C., with a slight evaporation of water. The Pd content of the solution was 0.6% by weight. Other cation concentrations were Al (2.1%), Fe (0.8%), Ca (1.1%), Mg (0.5%). In addition, the solution contained 0.3% colloidal silica. An ethylene-air mixture containing 50% (volume) $C_2H_4$ (explosive limits 2.7 to 28.5% by volume $C_2H_4$) was passed through 1 liter of solution with vigorous stirring. After 12 minutes the precipitation was quantitative. The black palladium was filtered off and washed with dilute HCl. After drying the precipitate at 100° C., its palladium content was 99.7%. The yield was 99.9%, related to the amount of the palladium in the inactive catalyst.

EXAMPLE 2

In this case, an inactive Pd-on-$Al_2O_3$ catalyst was processed as in Example 1. The Pd content of the catalyst was 0.1% by weight. In order to separate the palladium, 1% (10 cc.) $H_2O_2$ as a 35% solution was added to 1 liter of the solution containing 0.3% Pd, and propylene was used for the precipitation. The Pd was quantitatively precipitated within 10 minutes. After re-dissolving the precipitate with $HCl/Cl_2$ and subsequent precipitation, the Pd content of the precipitate was 100.0%. The yield was 99.8%, based on the amount of Pd in the inactive catalyst.

EXAMPLE 3

To 100 ml. of the acid Pd solution according to Example 1 were added 2 ml. of octene-1 as a supernatant layer, and air was introduced at 80° C. while stirring. After 35 minutes, the precipitation was complete. The Pd content of the precipitate was 99.5% and the yield 99.7%.

EXAMPLE 4

The reaction was carried out as described in Example 3, with the exception that 3 ml. of vinylidene chloride was used instead of octene-1. After 3 hours the precipitation of the Pd was complete. The precipitate contained 99.3% palladium, and the yield of Pd was 99.7%.

EXAMPLE 5

1 liter of a hydrochloric acid solution containing 0.5% $PdCl_2$, which was obtained according to the procedure of Example 1, was heated to 80° C., and ethylene was introduced after the addition of 4.5 g. $KMnO_4$. After 30 minutes the precipitation of the Pd was quantitative. The precipitate contained 99.6% Pd, the yield was 99.4% Pd.

EXAMPLE 6

The procedure of Example 5 was repeated with the exception that 5.8 g. $K_2Cr_2O_7$ was used instead of 4.5 g. $KMnO_4$. After 35 minutes the precipitation of the Pd was complete. The precipitate contained 99.3% Pd, and the yield was 99.2% Pd.

EXAMPLE 7

A catalyst containing 0.5% by weight of gold on the carrier described in Example 1 was processed in the same manner as described therein. There was obtained 0.6 liter of a solution containing 0.6% Au, 1.9% Al, 0.7% Fe, 1.0% Ca, 0.5% Mg in the form of their chlorides. After introducing a $C_2H_4$-air mixture (50:50 by volume) for 10 minutes, the precipitation of the gold was quantitative. The gold content of the precipitate was 99.9%. The yield, based on the catalyst, was 99.4% Au.

I claim:

1. Method for recovering a noble metal selected from the group consisting of palladium and gold, from solutions containing at least one of said metals and a member selected from the group consisting of less noble metals and silica, in which the noble metal or metals are separated from said less noble metals and from said silica by precipitation, said method comprising precipitating one or more of said metals from an acid solution in the presence of an open-chain unsubstituted alkene containing from 2 to 8 carbon atoms and an oxidizing agent selected from the group consisting of air and oxygen.

2. Method according to claim 1 wherein the alkene is ethylene or propylene.

3. Method according to claim 1 wherein the precipitation is carried out at a pH of less than 6.

4. Method according to claim 3 wherein the precipitation is carried out at a pH of less than 5.

5. Method according to claim 4 wherein the precipitation is carried out at a pH of less than 3.

References Cited

UNITED STATES PATENTS

| | | | |
|---|---|---|---|
| 3,471,567 | 10/1969 | Gourlay | 75—108 R |
| 3,337,555 | 8/1967 | Billman et al. | 75—108 X |
| 2,863,762 | 12/1958 | Pullen | 75—108 X |
| 2,162,936 | 6/1939 | Bunell | 75—108 |

HERBERT T. CARTER, Primary Examiner

U.S. Cl. X.R.

75—118, 121